Oct. 8, 1940.                    P. STUMPF                    2,217,240
          METHOD AND APPARATUS FOR MAKING MOTION PICTURES
                    Filed Sept. 22, 1937        3 Sheets-Sheet 1
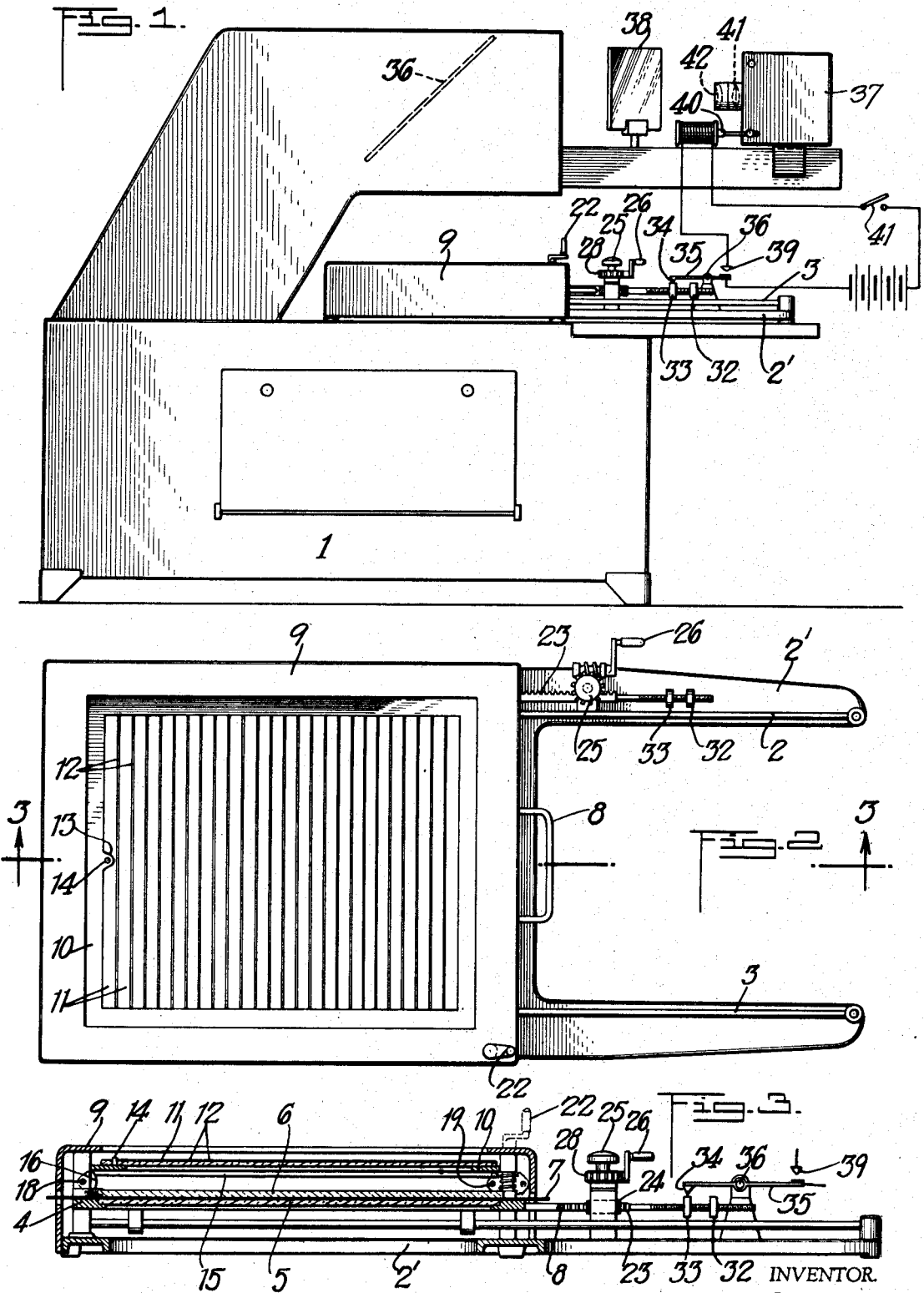
INVENTOR.
PLEIKART STUMPF
BY Karl A. Mayr
ATTORNEY.

Oct. 8, 1940.  P. STUMPF  2,217,240
METHOD AND APPARATUS FOR MAKING MOTION PICTURES
Filed Sept. 22, 1937  3 Sheets—Sheet 2
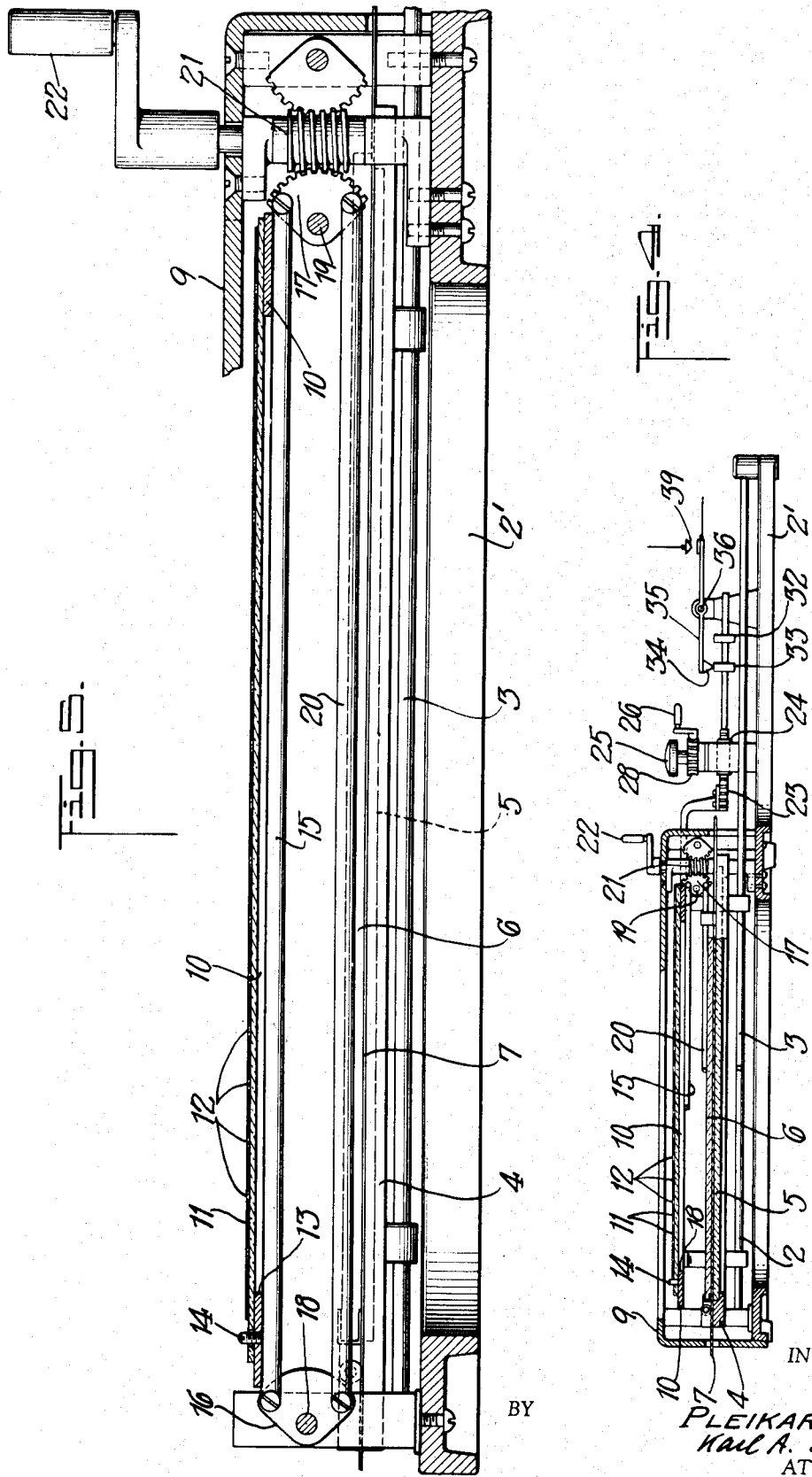
INVENTOR.
PLEIKART STUMPF
ATTORNEY.

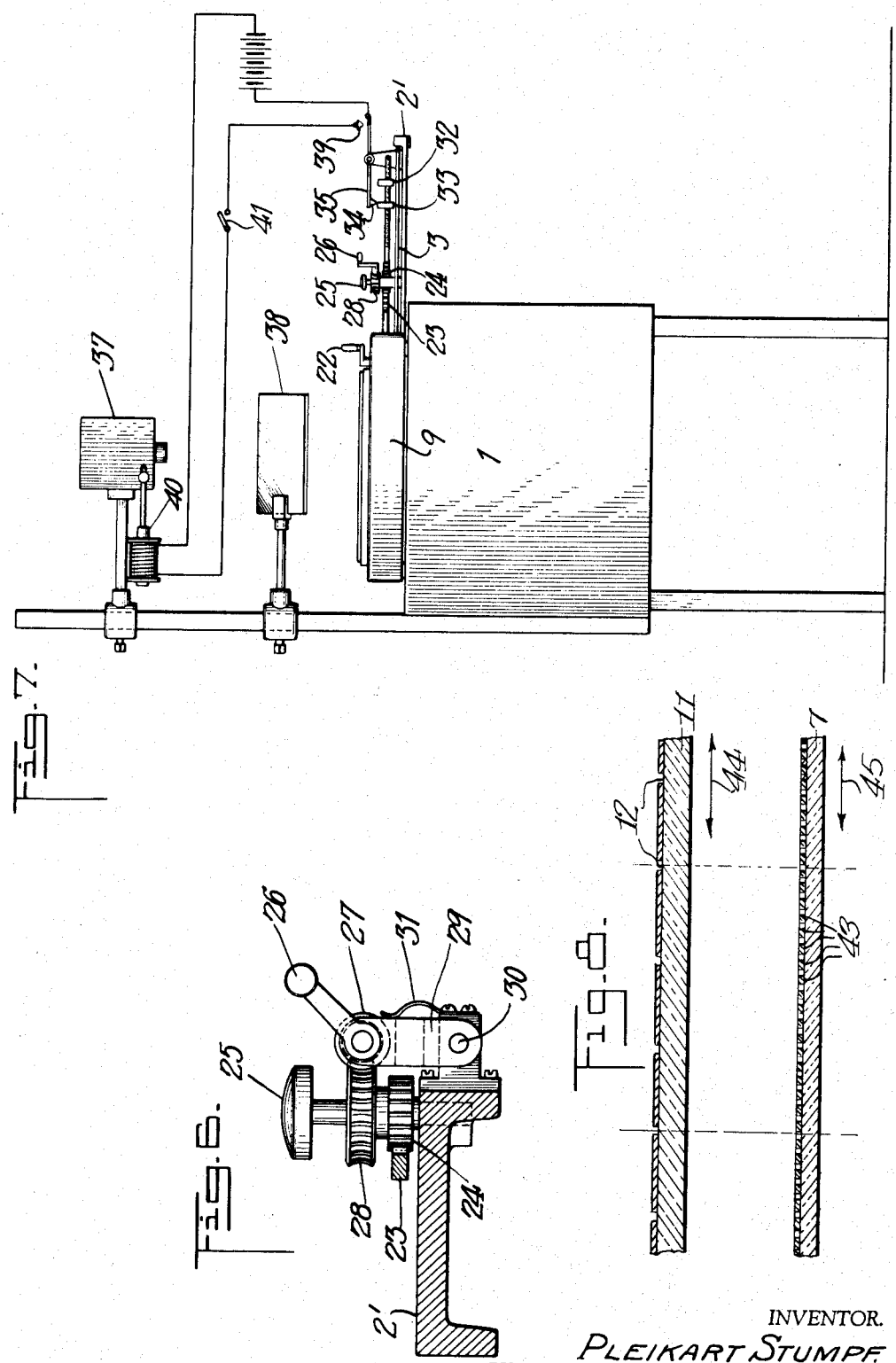

Patented Oct. 8, 1940

2,217,240

UNITED STATES PATENT OFFICE 2,217,240

METHOD AND APPARATUS FOR MAKING MOTION PICTURES

Pleikart Stumpf, Munich, Germany

Application September 22, 1937, Serial No. 165,050

9 Claims. (Cl. 88—24)

The present invention relates to a method and apparatus for making motion picture films from still pictures which, for simplicity's sake, I shall call henceforth kymograms; a kymogram is a photograph on which several phases of the motions of a moving body are pictured side by side and that not by taking successive pictures, for example, on a strip of film but by covering parallel strips of the moving object by means of a screen having parallel transparent lines and moving said screen in a direction perpendicular to said transparent lines whereby a plurality of picture-lines showing successive phases of the motion of the object are photographed side by side on the same photograph. Such kymograms may also be attained by providing a stationary screen and moving the photographic film or plate.

An object of the present invention is the provision of a method and apparatus as set forth in the paragraph next above by means of which a correct pictorial reproduction of the movement of moving objects is obtained whereby a small kymogram is made of the object in motion and from said kymogram a motion picture film is produced.

The present invention lends itself particularly well to the transformation of X-ray kymograms into motion picture films and it is the particular object of the present invention to provide a method and apparatus by means of which motion picture films can be made from X-ray kymograms with the aid of the same apparatus used for inspecting and demonstrating X-ray kymograms the so-called kymoscope. The apparatus briefly characterized by the work kymoscope is explained at line 71, column 1, page 2 of the present specification.

Further and other objects of the present invention will be hereinafter set forth in the accompanying specification and claims and shown in the drawings which, by way of illustration, show what I now consider to be a preferred embodiment of my invention.

In the drawings:

Figure 1 is a diagrammatic side view of the apparatus according to the present invention.

Fig. 2 is a top view of a detail of the apparatus shown in Fig. 1 showing particularly the apparatus for producing the pictures from which the motion picture film is made.

Fig. 3 is a longitudinal sectional view of the part of the apparatus shown in Fig. 2 and taken along line 3—3 of Fig. 2.

Fig. 4 is a longitudinal sectional view of a modification of the part of the apparatus more particularly shown in Figures 2 and 3.

Fig. 5 is a large scale view of a detail of the apparatus shown in Figures 2, 3 and 4.

Fig. 6 shows a detail of the apparatus according to the present invention on a large scale.

Fig. 7 shows a modification of the apparatus according to the present invention.

Figure 8 diagrammatically shows a large scale cross section of a kymogram and a cooperating plate having transparent lines.

Like numerals indicate like parts in all figures of the drawings. 1 indicates a support to which two slide rails 2 and 3 are mounted. On rails 2 and 3 rests the slide frame 4 which holds a transparent plate 5 on which the so-called kymogram in the form of a transparent photographic positive or negative 7 is placed. Another transparent plate 6 rests on top of the picture 7 and holds it down flatly. Frame 4 is provided with a handle 8 by means of which it can be pulled out of casing 9 as far as the length of rails 2 and 3 permits.

Spaced from plate 6 is another support frame 10 for supporting the screen plate 11 which has transparent slots 12 which are parallel to one another. Plate 11 may be provided with a notch 13 for cooperating with pin 14 and ascertaining correct position of plate 11 also in the darkness.

Frame 10 is supported in such a manner that its distances from the picture 7 can be varied at will. For this purpose frame 10 is mounted on support rods 15 which are shown in large scale in Fig. 5. The end of rods 15 are individually revolvably connected to segment members 16 and 17 which rotate about fulcrums 18 and 19 respectively which fulcrums are stationary. To complete a kinematic parallelogram rods 20 are movably connected with their ends to the segment members 16 and 17. The outer circumference of segment member 17 is teethed, the teeth cooperating with a worm 21 which can be revolved by operating handle 22. Upon moving segment 17 in clockwise direction screen 11 is lowered and on moving it counterclockwise the screen is raised.

For moving support frame 4 in a direction which is perpendicular to the lines 12 a rack 23 is provided. This rack cooperates with a pinion 24 which can be revolved directly by twisting the knob 25 or indirectly by revolving crank 26 and worm 27 which latter cooperates with worm wheel 28 which is connected to and drives pinion 24. Worm 27 must be removed from wheel 28 whenever knob 25 is operated. For this reason worm 27 is revolvably supported by lever 29 which swings about fulcrums 30 which are mounted to the extension 2' of support 1. Normally lever 29 and with it worm 27 is pressed towards wheel 28 by means of a spring 31.

Instead of moving the frame 4 with the picture 7, screen 11 may be moved. In this case the rack 23 is connected to frame 10 and the mechanism shown in Fig. 5 is used for supporting frame 4 and varying its distance from screen 11. This modification is shown in Fig. 4.

In order to obtain a true reproduction of the motions of the object which is photographed to the film or plate 7 this film or plate must be moved as far as the screen or photographic film was moved when the picture was made originally, i. e., for example for a distance which corresponds to the distance between two lines of the original screen. To check this movement elements 32 and 33 are provided which are screwed to a threaded extension of rack 23. By revolving elements 32 and/or 33 their position relatively to one another and with respect to the picture 7 can be changed. Elements 32 and 33 are adapted to cooperate with an abutment 34 on the end of two arm lever 35 which swings about fulcrum 36 which is in fixed relation to the stationary support arm 2'. Elements 32 and 33 and picture 7 on frame 4 are so set that whenever said elements contact the abutment 34 picture 7 is in a position with respect to the transparent lines 12 which corresponds to its position with respect to the transparent lines of the screen in connection with which the picture was first taken. The distance between the points of abutment of member 34 with member 32 and with member 33 corresponds to the distance of two transparent lines or of two adjacent stripes of picture 7.

Figure 8 is a large scale diagrammatic showing of a section of a kymogram 7 and a section of a plate 11 having transparent lines 12 which sections are taken in a direction which is rectangular to the transparent lines and pictures stripes of which the kymogram is composed. The picture stripes 43 are substantially parallel and show individual positions or phases of the moving object which has been photographed through moving parallel slots or on a moving film through stationary slots. Depending on the distance of the transparent slots and the relative speeds at which the moving object and the screen with the transparent slots and/or photographic film move, the distance of the picture stripes will coincide with or be different from the distance of two adjacent transparent lines. Normally the kymogram comprises a plurality of adjacent, parallel groups of parallel, adjacent and partly overlapping picture lines, each of said groups representing a parallel sectional view of the moving object, said lines individually representing a parallel subsectional view of consecutive phases of motion of said object. The directions in which plate 11 or kymogram 7 is moved for carrying out the present invention are indicated on Fig. 8 by means of arrows 44 and 45 respectively.

Underneath the plate 5 a strong source of light is provided which is common in the art and not shown. The picture on plate or film 7 is thrown through the screen 11 onto mirror 36 which is inclined and therefrom into the lens 41 of the motion picture camera 37. Figure 7 shows a simplified apparatus in which mirror 36 is omitted.

An apparatus without motion picture camera and in which the picture rays emanating from casing 9 are observed by the human eye either directly or after they are suitably diverted by a mirror such as 36, is called a kymoscope. An apparatus in which the picture rays are projected onto a screen so that they can be observed simultaneously by a plurality of observers is called a kymo-projection apparatus.

On the way of the light rays between mirror 36 and said lens, in the apparatus according to the present invention, a glass plate 38 may be provided which is inclined with respect to the direction of the light rays so that part of the light is transmitted to camera 37 and part to an observer. In such manner the moving picture as taken by camera 37 can be made visible. In order to spread out the individual pictures coming through the transparent lines 12 of the screen 11 a cylinder-shaped lens 42 may be provided to cooperate with lens 41 of camera 37; by this means a more coherent motion picture is obtained.

In order to make the transparent lines 12 coincide with the lines on the picture 7 which are caused by the lines of the screen through which the picture was originally taken and which may have a spacing which is different from that of lines 12, screen 11 is raised or lowered by means of the apparatus shown in detail in Figure 5.

For producing a true reproduction of the motion originally photographed and to be transferred to a motion picture film picture 7 must be moved for a distance which corresponds to the distance of the picture stripes on picture 7. This motion is checked by the apparatus comprising members 32 to 35 already described.

Camera 37 must be started whenever the same light rays go through a transparent line 12 and a line of picture 7 which was originated by a transparent line of the screen through which the picture was taken. Members 32 and 33 are so set that member 34 contacts one of the members 32 and 33 whenever there is coincidence of a line 12 and a line on picture 7 and that it contacts the other member when the next following line 12 coincides with the next following line on picture 7. Upon contact of member 34 with one of the members 32 or 33 lever 35 is turned clockwise and switch 39 is opened. This causes a release of the solenoid core 40 which is connected with the release of camera 37, thereby camera 37 is stopped. As described before, picture 7 or rather its frame 4 is moved by turning crank 26 or knob 25. After passing from one line 12 to the next following line 12 the picture must be returned for the same distance. In order to prevent operation of the camera as long as switch 39 is closed during said return motion another switch 41 is provided in series with switch 39 and said switch 41 is held open by hand during the return movement of picture 7.

The before described operation, i. e., moving the picture with respect to the screen for the distance between two picture stripes and two transparent lines 12 while the motion picture camera is in operation and reversing said movement while the camera is not in operation, may be repeated as often as desired in order to obtain a motion picture film of desired length. For example, the movement of the kymogram of a beating human heart for the distance between two transparent lines may give a motion picture of one operating cycle of the heart. This motion picture is photographed by a motion picture camera which takes a plurality of consecutive individual pictures which are slightly different from one another. These pictures together reproduce one cycle of operation of the heart, for example, one heart beat. By repeating the process a motion picture photograph is consecutively made several times of the same cycle of operation. Thus a film of any length can be produced which can be run continuously in a projection apparatus whereby the working of the heart can be continuously observed for any length of time without rewinding the film. The first time the observer may have missed a certain phase of the operation or the film was run too fast. He may slow down the projection apparatus and observe the same operation several times at various speeds.

While I believe the above described embodiments of my invention to be preferred embodiments, I wish it to be understood that I do not desire to be limited to the exact details of design and construction shown and described, for obvious modifications will occur to a person skilled in the art, for example, instead of transparent pictures 7 non-transparent pictures may be used and the source of light may be located to throw light onto the upper surface of said non-transparent pictures.

For simplicity's sake the expression "kymogram" is used in the claims. The meaning of this expression is set forth in the first paragraph of the present patent specification. In addition to what is said in said paragraph "kymogram" may be explained as being a picture made of a moving object continuously, i. e., without interruption with respect to time but by spatially subdividing the picture of the moving object as received by the eye of the picture maker, i. e., the photographic camera, by means of a screen having parallel transparent lines.

I claim:

1. The method of producing a motion picture film from a kymogram comprising passing the light rays constituting individual parallel picture stripes of said kymogram through transparent parallel lines of a screen which lines are also parallel to said picture stripes, directing said rays into the lens of a motion picture camera, and continually moving said screen and said kymogram with respect to one another and in a direction at right angle to said lines for the distance between two transparent lines only while said camera is in operation.

2. The method of producing a motion picture film from a kymogram comprising passing the light rays constituting individual picture stripes of said kymogram through transparent parallel lines of a screen and then into the lens of a motion picture camera, moving said kymogram relatively to said screen for the distance between two picture stripes only while said camera is in operation and reversing the movement of said kymogram relatively to said screen while said camera is not in operation.

3. The method of producing a motion picture film from a kymogram comprising passing the light rays constituting individual picture stripes of said kymogram through transparent parallel lines of a screen and then into the lens of a motion picture camera, moving said kymogram relatively to said screen for the distance between two picture stripes only while said camera is in operation, reversing the movement of said kymogram relatively to said screen while said camera is not in motion, and repeating said operation a plurality of times whereby a continuous motion picture film of any desired length is obtained.

4. The method of producing a motion picture film from a kymogram comprising passing the light rays constituting individual picture stripes of said kymogram through transparent parallel lines of a screen which lines are maintained in parallel position with respect to said stripes, and then passing said rays into the lens of a motion picture camera, moving said kymogram relatively to said screen in a direction at right angle to said stripes and lines and for the distance between two picture stripes only while said camera is in operation, and operating said camera only while said kymogram is in motion with respect to said screen.

5. The method of producing a motion picture film from a kymogram comprising passing the light rays constituting individual picture stripes of said kymogram through transparent parallel lines of a screen which lines are maintained in parallel position with respect to said stripes, and then passing said rays into the lens of a motion picture camera, moving said screen relatively to said kymogram in a direction at right angle to said stripes and lines and for the distance between two transparent lines only while said camera is in operation.

6. The method of producing a moving picture of a moving object comprising the step of making a kymogram of the object by repeatedly photographing the moving object through a screen having a plurality of transparent parallel lines and moving said screen and photographing camera relatively to one another, said kymogram consisting of a plurality of adjacent, parallel groups of parallel, adjacent and partly overlapping picture lines, each of said groups representing a parallel sectional view of the moving object, said lines individually representing parallel subsectional views of consecutive phases of motion of said object, the step of viewing said picture lines through transparent parallel lines of a screen which screen and transparent lines are in parallel relative position to said kymogram and said picture lines, and the step of moving said kymogram and said screen relatively and substantially parallel and equidistantly with respect to one another and in a manner conforming to the relative movement of said first mentioned screen and said camera.

7. The method of producing a moving picture of a moving object comprising the step of making a kymogram of the object by repeatedly photographing the moving object through a screen having a plurality of transparent parallel lines and moving said screen and photographing camera relatively to one another, said kymogram consisting of a plurality of adjacent, parallel groups of parallel, adjacent and partly overlapping picture lines, each of said groups representing a parallel sectional view of the moving object, said lines individually representing parallel subsectional views of consecutive phases of motion of said object, the step of viewing said picture lines through a magnifying means and transparent parallel lines of a screen which screen and transparent lines are in parallel relative position to said kymogram and said picture lines, and the step of moving said kymogram and said screen relatively and substantially parallel and equidistantly with respect to one another and in a manner conforming to the relative movement of said first mentioned screen and said camera, the picture lines visible through said transparent lines being broadened by said means and the individual lines view flowing into one another and producing a smooth and continuous moving picture.

8. The method of producing a moving picture of a moving object comprising the step of making a kymogram of the object by repeatedly photographing the moving object through a screen having a plurality of transparent parallel lines and moving said screen and photographing camera with respect to one another, said kymogram including a plurality of adjacent, parallel groups of parallel, adjacent and partly overlapping picture lines, each of said groups representing a parallel sectional view of the moving object, said lines individually representing parallel subsectional views of consecutive phases of motion of said object, the step of viewing said picture lines through transparent parallel lines of a screen which screen and transparent lines are in parallel relative position to said kymogram and said picture lines, and the step of moving said kymogram and said screen relatively and substantially parallel and equidistantly with respect to one another and in a direction at right angle to said lines and at a speed which is in proportion to the speed of relative motion of said first mentioned screen and camera.

9. The method of producing a moving picture of a moving object comprising the step of making a kymogram of the object by repeatedly photographing the moving object through a screen having a plurality of transparent parallel lines and moving said screen and photographing camera relatively to one another, said kymogram consisting of a plurality of adjacent, parallel groups of parallel, adjacent and partly overlapping picture lines, each of said groups representing a parallel sectional view of the moving object, said lines individually representing parallel subsectional views of consecutive phases of motion of said object, the step of viewing said picture lines through transparent parallel lines of a screen which screen and transparent lines are in parallel relative position to said kymogram and said picture lines, the step of moving said kymogram and said screen relatively and substantially parallel and equidistantly with respect to one another and in a direction at right angle to said lines, and changing the distance between said kymogram and said screen to obtain a moving picture proportionately conforming with said moving object.

PLEIKART STUMPF.